(12) United States Patent
Singh et al.

(10) Patent No.: US 7,133,457 B2
(45) Date of Patent: Nov. 7, 2006

(54) JOINT TIMING RECOVERY FOR MULTIPLE SIGNAL CHANNELS

(75) Inventors: Manoneet Singh, Sunnyvale, CA (US); Sirikiat Lek Ariyavisitakul, Alpharetta, GA (US)

(73) Assignee: Texas Instruments Incorporated, Dallas, TX (US)

( * ) Notice: Subject to any disclaimer, the term of this patent is extended or adjusted under 35 U.S.C. 154(b) by 740 days.

(21) Appl. No.: 10/608,679

(22) Filed: Jun. 27, 2003

(65) Prior Publication Data

US 2005/0207508 A1 Sep. 22, 2005

(51) Int. Cl.
*H04K 1/10* (2006.01)
*H04L 27/06* (2006.01)
*H04B 1/10* (2006.01)

(52) U.S. Cl. .................. 375/260; 375/340; 375/349; 375/350

(58) Field of Classification Search ............. 375/144, 375/148, 260, 267, 340, 347–350
See application file for complete search history.

(56) References Cited

U.S. PATENT DOCUMENTS

| | | | |
|---|---|---|---|
| 5,202,903 A * | 4/1993 | Okanoue | 375/347 |
| 5,297,168 A * | 3/1994 | Sant'Agostino et al. | 375/347 |
| 5,500,620 A | 3/1996 | Brown et al. | 329/300 |
| 5,809,086 A | 9/1998 | Ariyavisitakul | 375/332 |
| 6,130,909 A | 10/2000 | Anvari et al. | 375/232 |
| 6,138,244 A | 10/2000 | Jin et al. | 713/400 |
| 6,141,393 A * | 10/2000 | Thomas et al. | 375/347 |
| 6,154,506 A | 11/2000 | Ishikawa et al. | 375/326 |
| 6,404,827 B1 * | 6/2002 | Uesugi | 375/340 |
| 6,700,919 B1 * | 3/2004 | Papasakellariou | 375/130 |

\* cited by examiner

*Primary Examiner*—Don N. Vo
(74) *Attorney, Agent, or Firm*—Steven A. Shaw; W. James Brady; Frederick J. Telecky, Jr.

(57) ABSTRACT

A spatial diversity receiver and method for determining a multichannel combined symbol timing marker that identifies an energy concentration for a combination of channel delay spreads in order to reduce the complexity of equalization. The receiver includes two or more receiver chains having spatially diverse antennas; a multichannel combined timer; and a multichannel combined equalizer for receiving wireless signals through two or more signal channels. The multichannel combined timer combines energies corresponding to the channel impulse response coefficients for all the channels for determining a series of multichannel combined metrics having associated index cursors, and then determines the multichannel combined symbol timing marker from the index cursor for the largest of the metrics. The symbol timing marker synchronizes the received symbols issued to the equalizer jointly to the energy concentration for the delay spreads combined for all the channels.

22 Claims, 7 Drawing Sheets

JOINT TIMING RECOVERY FOR MULTIPLE SIGNAL CHANNELS

BACKGROUND OF THE INVENTION

1. Field of the Invention

The invention relates generally to symbol timing recovery and more particularly to an apparatus and method for recovering a common symbol timing marker for multiple channel signals received with multiple antennas.

2. Description of the Prior Art

When a signal is transmitted over a channel with multiple propagation paths with different delays (multipath channels), the received signal is a linearly dispersed (smeared) version of the transmitted signal. Equalization and spatial diversity are used in existing systems for reducing the distorting effects of multipath. Spatial diversity requires multiple antennas for receiving a signal through multiple signal channels. Equalization uses an equalizer to recover the original transmitted signal from its dispersed version at the receiver, in the presence of additive noise.

The equalizer requires an estimate of the impulse response of the channel through which the transmission took place. In packet-based systems that require fast startup, the channel estimate is typically obtained by processing a known training sequence, such as a preamble, midamble or a synch word. The channel impulse response estimate is obtained as a series of samples or "coefficients" that represent the multipath delay spread profile of the channel during a particular packet.

Several equalizer structures exist in the art. A maximum likelihood sequence estimate (MLSE) equalizer provides optimum symbol detection. Unfortunately, the number of trellis states in an MLSE equalizer increases exponentially with the number of impulse response coefficients. Unless the packet time is accurately known and the delay spread is narrow, the complexity of the MLSE equalizer can be prohibitive.

Two other equalizer types commonly used today are the decision feedback equalization (DFE) equalizer and delayed decision feedback sequence estimation (DDFSE) equalizer. The DFE equalizer uses a feedforward filter and the DDFSE equalizer uses a Viterbi sequence estimator. However, the DFE and DDFSE equalizers are also prohibitively complex unless time is accurately known and delay spread is small because the number of taps in the feedforward filter and the number of states in the Viterbi sequence estimator increase with the number of coefficients of the channel impulse response.

Ariyavisitakul in U.S. Pat. No. 5,809,086 entitled "Intelligent Timing Recovery for a Broadband Adaptive Equalizer" incorporated herein by reference presents a technique for reducing the complexity of DFE or DDFSE equalizers. Unfortunately, the symbol timing recovery systems presented by Ariyavisitakul are operable only for a single signal channel. Anvari et al. in U.S. Pat. No. 6,130,909 shows a multichannel system having equalization. However, the system shown by Anvari et al. and all others so far as is known, would be expected to suffer from poor performance if any one of the multiple channels had a low signal-to-noise. There remains a need for a symbol timing recovery system for reducing equalizer complexity in a multichannel system.

SUMMARY OF THE INVENTION

It is therefore an object of the present invention to provide a multichannel method and apparatus for determining a multichannel combined symbol timing marker that identifies an energy concentration for a combination of channel delay spreads in a combination of signal channels in order to reduce the complexity of equalization.

Briefly, in a preferred embodiment, a multichannel signal receiver of the present invention includes two or more receiver chains; a multichannel combined timer including a multichannel combiner and a metric comparator; and a multichannel combined equalizer for receiving wireless signals through two or more signal channels. The equalizer has a predetermined span for equalizing the channels.

The receiver chains include spatially diverse antennas, signal processing circuitry, and channel estimators. The antennas and the signal processing circuitry receive the wireless channel signals and provide receiver chain signals. The channel estimators use the receiver chain signals for determining channel impulse response coefficients for each signal channel. The multichannel combiner combines energies corresponding to the channel coefficients from all the channels for determining a series of multichannel combined metrics having associated index cursors. The metric comparator determines the largest of the metrics and issues a multichannel combined symbol timing marker for the corresponding cursor. The symbol timing marker identifies the location in time of the energy concentration for the delay spread for the combination of the signal channels. The equalizer equalizes the combination of the channel signals jointly synchronized by the symbol timing marker for providing equalized symbols.

These and other objects and advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
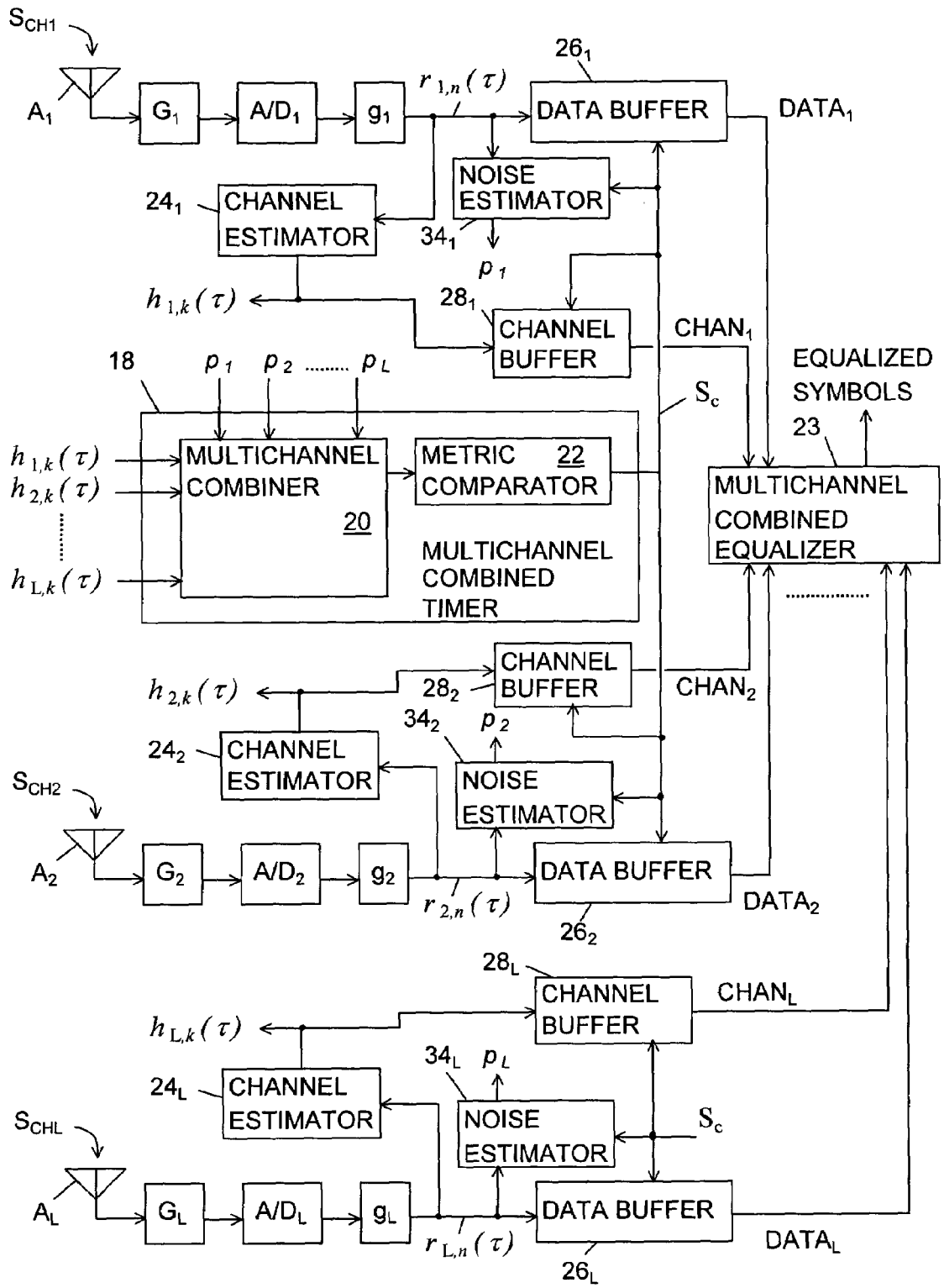
FIG. 1 is a block diagram of a multichannel signal receiver of the present invention.

FIG. 1 is a block diagram of a multichannel signal receiver of the present invention referred to by the general reference number 10. The receiver 10 includes two or more receiver chains 1, 2 through L. As described herein, structural elements of the receiver chains 1, 2 through L are referenced with subscripts "1", "2" through "L", respectively. It should be noted that the present invention can be used with any number of channels and receiver chains equal to or greater than two.

Figure 2:
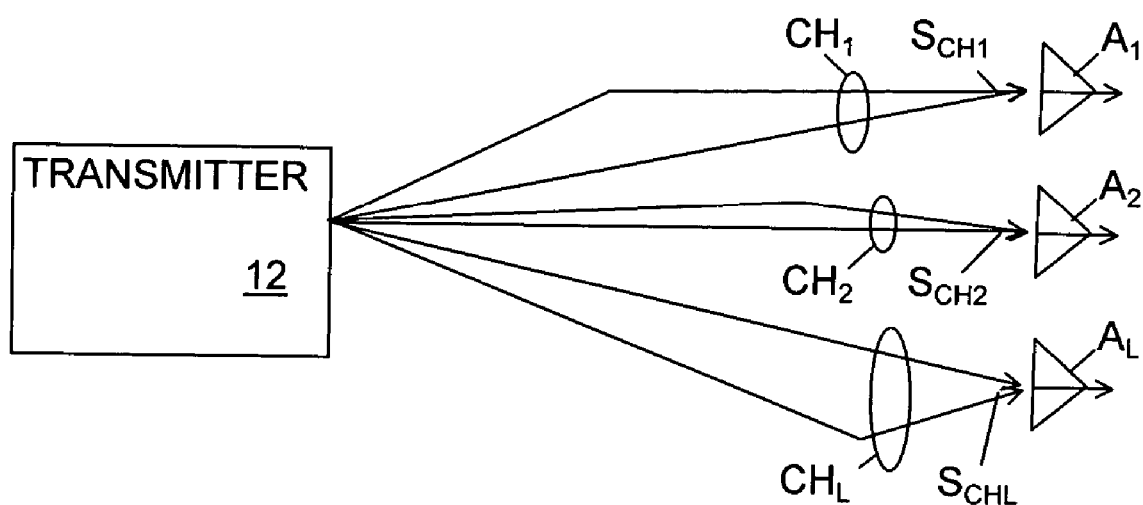
FIG. 2 is a block diagram showing multipath signals received through multiple signal channels by multiple antennas in the receiver of FIG. 1.

The receiver chains 1, 2 through L include antennas $A_1$, $A_2$ through $A_L$, respectively, having different spatial positions (spatial diversity). Referring to FIG. 2, a transmitter 12 transmits a wireless transmitted signal that passes through channels $CH_1$, $CH_2$ through $CH_L$ to be received as wireless channel signals $S_{CH1}$, $S_{CH2}$ through $S_{CHL}$ by the antennas $A_1$, $A_2$ through $A_L$, respectively. In general, each of the channel signals $S_{CH1}$, $S_{CH2}$ through $S_{CHL}$ is composed of several signals traveling different geometric paths (multipath) due to reflections. Because the antennas $A_1$, $A_2$ through $A_L$ have different spatial positions, the multipath fading experienced by one of the antennas $A_1$, $A_2$ through $A_L$ will not necessarily be experienced by the other antennas $A_1$, $A_2$ through $A_L$.

Returning to FIG. 1, the receiver chains 1, 2 through L include analog circuitry, denoted $G_1$, $G_2$ through $G_L$, analog-to-digital converters, denoted $A/D_1$, $A/D_2$ through $A/D_L$, and digital circuitry, denoted $g_1$, $g_2$ through $g_L$. The antennas $A_1$, $A_2$ through $A_L$ convert the RF wireless signals $S_{CH1}$, $S_{CH2}$ through $S_{CHL}$ into RF conducted signals and pass the RF conducted signals to the analog circuitry $G_1$, $G_2$ through $G_L$. The analog circuitry $G_1$, $G_2$ through $G_L$ amplifies, filters and frequency downconverts the RF conducted output signals to intermediate signals and pass the intermediate signals to the analog-to-digital converters $A/D_1$, $A/D_2$ through $A/D_L$. The analog-to-digital converters $A/D_1$, $A/D_2$ through $A/D_L$ convert the intermediate signals from an analog format to a digital format and pass the digital format signals to the digital circuitry $g_1$, $g_2$ through $g_L$. Preferably, there are several analog-to-digital converters $A/D_1$, $A/D_2$ through $A/D_L$ operating in parallel sampled at two or more offset phases $\tau$ for providing parallel digital signals at the phases $\tau$. The digital circuitry $g_1$, $g_2$ through $g_L$ amplifies, level shifts, filters and/or frequency converts the digital signals for providing receiver chain signals $r_{1,n}(\tau)$, $r_{2,n}(\tau)$ through $r_{L,n}(\tau)$, respectively, as shown in an equation 1, below.

$$r_{l,n}(\tau) = \sum_{k=-K_1}^{K_2} x_{n-k} h_{l,k}(\tau) + \eta_{l,n}, k = -K_1 \text{ to } K_2 \quad (1)$$

In the equation 1, the $r_{l,n}(\tau)=r_l(nT+\tau)$ is the receiver chain signal for the lth receiver chain at a receiver chain index n corresponding to a time $nT+\tau$ where the $\tau$ denotes the phase and the T is the symbol period. The $x_{n-k}=x_m$ is the mth symbol in the transmitted signal from the transmitter 12 (FIG. 2). The $h_{l,k}(\tau)=h_l(kT+\tau)$ are the channel impulse response coefficients for the lth channel ($CH_1$, $CH_2$ through $CH_L$) at channel impulse response indexes k where k takes on values from a first channel impulse response index $-K_1$ to a last channel impulse index $+K_2$. The channels $CH_1$, $CH_2$ through $CH_L$ are assumed to have channel impulse response coefficients of zero, $h_{l,k}(\tau)=0$, for k less than the first channel index $-K_1$ or greater than the last channel index $+K_2$. The $\eta_{l,n}$ is the noise on the lth receiver chain signal at the nth receiver chain index.

The receiver 10 includes a multichannel combined timer 18 including a multichannel combiner 20 and a metric comparator 22. The multichannel combiner 20 blends the channel impulse response coefficients from all receiver chains 1, 2 through L for determining a series of multichannel combined metrics and the metric comparator 22 determines a multichannel combined symbol timing marker $S_C$ (FIG. 4C) as described in the detailed descriptions below from the largest of the multichannel combined metrics.

The receiver 10 also includes an equalizer 23, channel estimators $24_1$, $24_2$ through $24_L$, data buffers $26_1$, $26_2$ through $26_L$, channel buffers $28_1$, $28_2$ through $28_L$; and optional receiver chain noise estimators $34_1$, $34_2$ through $34_L$. The channel estimators $24_1$, $24_2$ through $24_L$ estimate sets of the channel impulse response coefficients $h_{1,k}(\tau)$, $h_{2,k}(\tau)$ through $h_{L,k}(\tau)$ according to the equation 1 by correlating the receiver chain signals $r_{1,n}(\tau)$, $r_{2,n}(\tau)$ through $r_{L,n}(\tau)$ against a known training sequence for the transmitted symbols $x_m$. The data buffers $26_1$, $26_2$ through $26_L$ use the symbol timing marker $S_C$ (FIG. 4C) to synchronize the receiver chain signals $r_{1,n}(\tau)$, $r_{2,n}(\tau)$ through $r_{L,n}(\tau)$ to the incoming symbols for providing synchronized receiver chain signals $DATA_1$, $DATA_2$ through $DATA_L$, respectively, to the equalizer 23.

The channel buffers $28_1$, $28_2$ through $28_L$ provide synchronized channel signals $CHAN_1$, $CHAN_2$ through $CHAN_L$, respectively, which are a subset of the channel coefficients $h_{1,k}(\tau)$, $h_{2,k}(\tau)$ through $h_{L,k}(\tau)$, $k=-K_1$ to $K_2$. The length of each of the $CHAN_{1-L}$ is equal to an equalizer span W. The first index k of the equalizer span W is identified by the symbol timing marker $S_C$. The equalizer 23 uses the synchronized channel signals $CHAN_1$, $CHAN_2$ through $CHAN_L$ for the symbol timing marker $S_C$ (FIG. 4C) and the equalizer index span W for equalizing the synchronized receiver chain signals $DATA_1$, $DATA_2$ through $DATA_L$ in order to provide equalized symbols. For example, when the symbol timing marker $S_C$ corresponds to a channel index k=10 and the equalizer span W is 6, the equalizer 23 uses the channel coefficients $h_{1,k}(\tau)$, $h_{2,k}(\tau)$ through $h_{L,k}(\tau)$ for the impulse response indexes 10, 11, 12, 13, 14 and 15 with the $DATA_{1-L}$ signals corresponding to the marker $S_C$ for providing the equalized symbols.

For optimum performance, the noise estimators $34_1$, $34_2$ through $34_L$ determine receiver chain noise levels $p_1$, $p_2$ through $p_L$ (corresponding to $\eta_{l,n}$ in the equation 1) for the receiver chain signals $r_{1,n}(\tau)$, $r_{2,n}(\tau)$ through $r_{L,n}(\tau)$, respectively. The noise levels $p_1$, $p_2$ through $p_L$ can be determined from a received signal strength indication (RSSI) measurement or by using a first estimate of the symbol timing marker $S_C$. The noise levels $p_1$, $p_2$ through $p_L$ can also be determined in an iterative approach using the equation 1 from the symbols in the receiver chain signals $r_{1,n}(\tau)$, $r_{2,n}(\tau)$ through $r_{L,n}(\tau)$. In the iterative approach either the symbol timing marker $S_C$ or the noises levels $p_1$, $p_2$ through $p_L$ are estimated first. Then the estimate of the symbol timing marker $S_C$ (or the noise levels $p_1$, $p_2$ through $p_L$) is used to determining the noise levels $p_1$, $p_2$ through $p_L$ (or symbol timing marker $S_C$) and the determinations of the noise levels $p_1$, $p_2$ through $p_L$ (or symbol timing marker $S_C$) are used to refine the estimate of the symbol timing marker $S_C$ (or noise levels $p_1$, $p_2$ through $p_L$) and so on.

The noise levels $p_1$, $p_2$ through $p_L$ are used in the multichannel combiner 20 for scaling the energies of the channel impulse responses $h_{1,k}(\tau)$, $h_{2,k}(\tau)$ through $h_{L,k}(\tau)$ by receiver chain scale factors $1/p_1$, $1/p_2$ through $1/p_L$, respectively. However, empirical results show that this scaling is not necessary for some systems and that good results may be obtained using equally weighted channel impulse response energies $|h_{1,k}(\tau)|^2$, $|h_{2,k}(\tau)|^2$ through $|h_{L,k}(\tau)|^2$. The scale factors may or may not be a constant and may or may not be the same for all channel impulse response energies $|h_{1,k}(\tau)|^2$, $|h_{2,k}(\tau)|^2$ through $|h_{L,k}(\tau)|^2$ depending upon the system.

The channel impulse response coefficients $h_{1,k}(\tau)$, $h_{2,k}(\tau)$ through $h_{L,k}(\tau)$ and optionally the noise levels $p_1$, $p_2$ through $p_L$ or other scale factors are received by the multichannel combiner 20. The multichannel combiner 20 combines the energies of the channel impulse response coefficients $h_{1,k}(\tau)$, $h_{2,k}(\tau)$ through $h_{L,k}(\tau)$ for predetermined channel indexes k into multichannel combined metrics having associated index cursors c (and phases $\tau$). The range of the channel indexes k and the combining algorithms (EQS. 2–4) depend upon the type of equalizer 23. Successive multichannel combined metrics are computed for successive cursors c starting at the cursor c at the first channel index ($-K_1$) and ending with the cursor c at the equalizer span W less than the last channel index ($K_2-W$). The metric comparator 22 determines the largest of the multichannel combined metrics and designates the cursor c (and the phase $\tau$) associated with the largest multichannel combined metric as the symbol timing marker $S_C$ (FIG. 4C).

There are several types of equalizers that can be used for the equalizer 23. Three of these types of the equalizer 23 are known in general terms as a maximum likelihood sequence estimator (MLSE) equalizer, a decision feedback equalization (DFE) equalizer, and a decision feedback sequence estimation (DDFSE) equalizer. The multichannel combiner 20 has embodiments 20A, 20B and 20C for use with the MLSE, DFE and DDFSE embodiments, respectively, of the equalizer 23.

Figure 3:
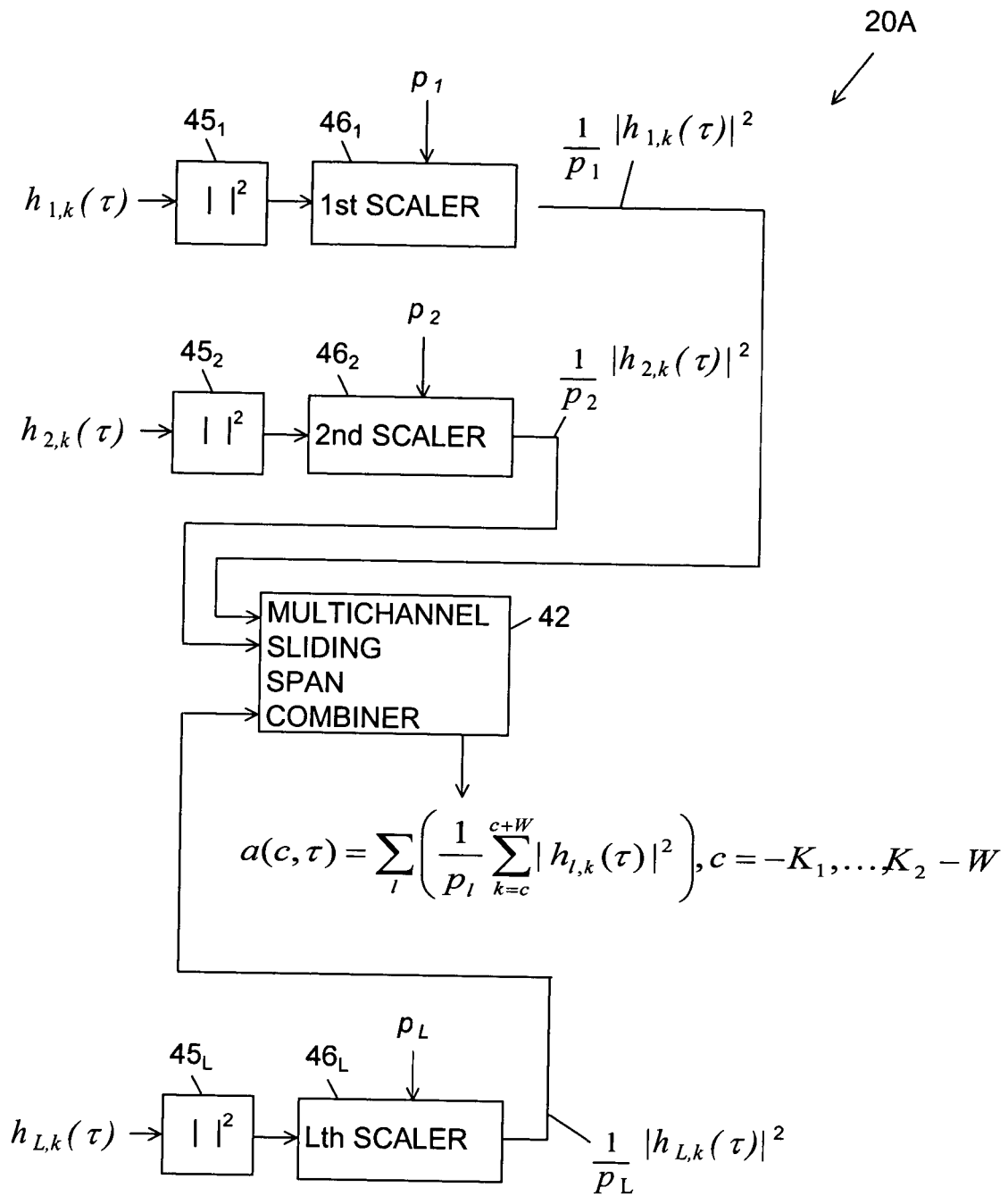
FIG. 3 is a block diagram of an MLSE embodiment of a multichannel combiner of the receiver of FIG. 1.

FIG. 3 is a block diagram of an MLSE embodiment of the multichannel combiner 20 referred to with the reference designator 20A. The MLSE multichannel combiner 20A computes a series of multichannel combined metrics, denoted as $\alpha(c, \tau)$, according to an equation 2, below.

$$\alpha(c, \tau) = \sum_l \frac{1}{p_l} \sum_{k=c}^{c+W} |h_{l,k}(\tau)|^2, \quad c = -K_1, \ldots, K_2 - W \quad (2)$$

As shown in the equation 2, the multichannel combiner 20A determines the series of multichannel combined metrics $\alpha(c, \tau)$ by combining the channel (impulse) response energies $1/p_1|h_{1,k}(\tau)|^2$, $1/p_2|h_{2,k}(\tau)|^2$ through $1/p_L|h_{L,k}(\tau)|^2$ for index k ranges equal to the equalizer index span W starting at index cursors c for the series of the index cursors c, respectively. The series of the cursors c takes on indexes from the first channel index $-K_1$ to the span W less than the last channel index $+K_2$. The metric comparator 22 determines the largest of the multichannel combined metrics $\alpha(c, \tau)$ and then uses the cursor c and phase $\tau$ (FIGS. 7A–D) of the argument (c, $\tau$) of the largest of the multichannel combined metrics $\alpha(c, \tau)$ for the symbol timing marker $S_C$.

The multichannel combiner 20A in a preferred embodiment includes a multichannel sliding span combiner 42 and functional elements, denoted as squarers $45_1$, $45_2$ through $45_L$ for deriving channel response energies $|h_{1,k}(\tau)|^2$, $|h_{2,k}(\tau)|^2$ through $|h_{L,k}(\tau)|^2$ from the channel impulse response coefficients $h_{1,k}(\tau)$, $h_{2,k}(\tau)$ through $h_{L,k}(\tau)$, respectively. Optionally, the MLSE multichannel combiner 20A also includes functional elements, denoted as scalers $46_1$, $46_2$ through $46_L$ for scaling the channel response energies $|h_{1,k}(\tau)|^2$, $|h_{2,k}(\tau)|^2$ through $|h_{L,k}(\tau)|^2$ by the receiver chain scale factors $1/p_1$, $1/p_2$ through $1/p_L$. The multichannel sliding span combiner 42 adds the index range of the channel response energies $1/p_1|h_{1,k}(\tau)|^2$, $1/p_2|h_{2,k}(\tau)|^2$ through $1/p_L|h_{L,k}(\tau)|^2$ for the equalizer index span W for the successive cursors c from $-K_1$ to $+K_2-W$ for providing the multichannel combined metrics $\alpha(c, \tau)$.

Figure 4A:
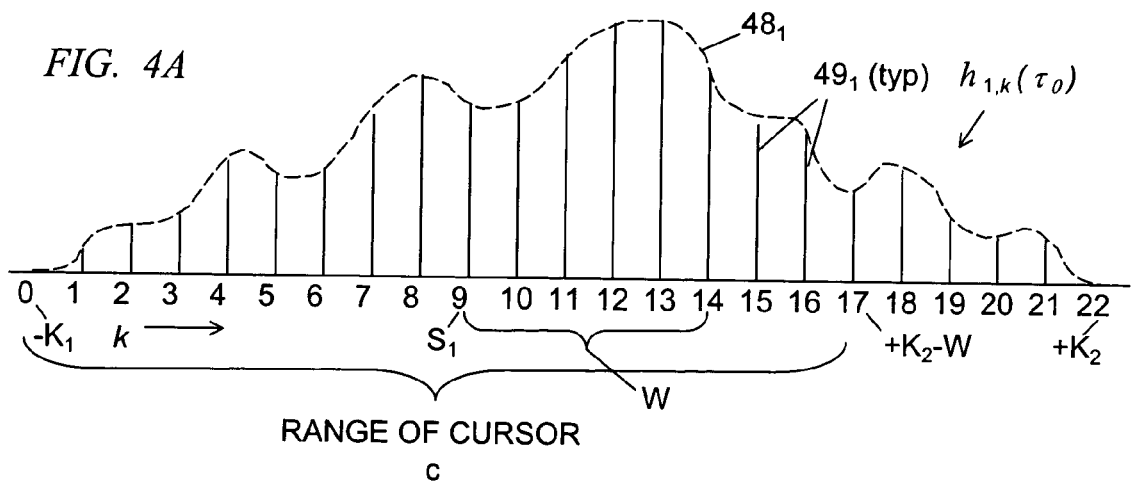
FIGS. 4A and 4B are charts showing channel impulse response coefficients for exemplary first and second channel impulse response coefficients, respectively.
Figure 4B:
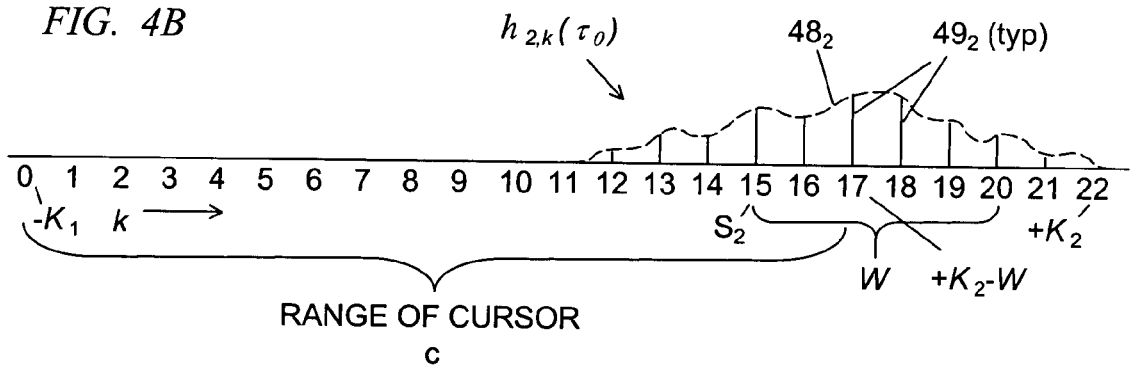
Figure 4C:
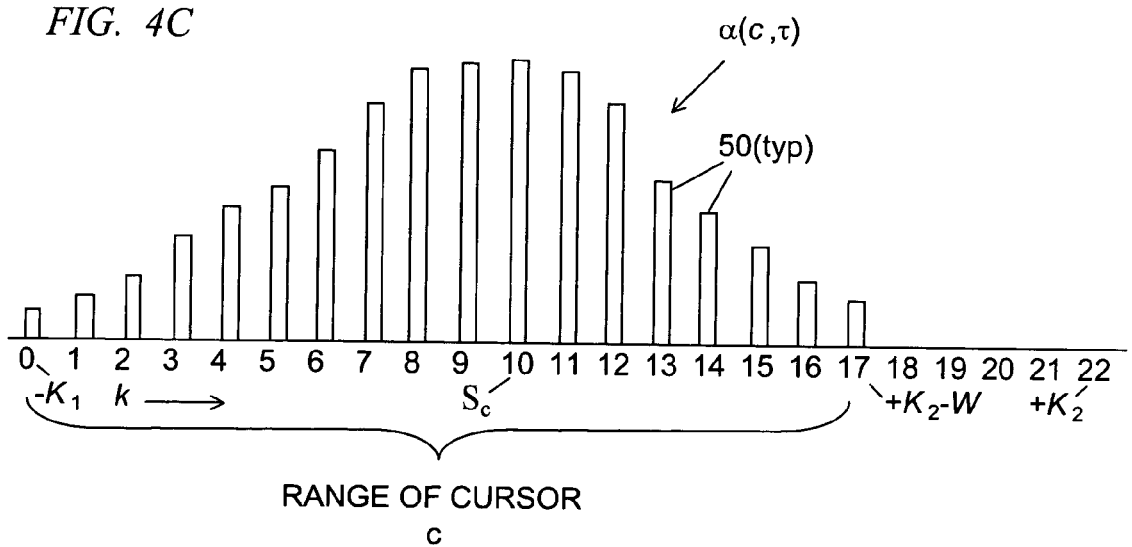
FIG. 4C is a chart showing a multichannel combined symbol timing marker of the present invention for the exemplary first and second channel impulse response coefficients of FIGS. 4A and 4B.

FIGS. 4A and 4B illustrate an exemplary case having first and second channel impulse response coefficients $h_{1,k}(\tau_0)$ and $h_{2,k}(\tau_0)$, respectively, for the channel index k from a first index $0$ ($-K_1$) to a last index 22 ($+K_2$) and a phase $\tau=\tau_0$. The dotted lines $48_1$ and $48_2$ represent envelopes of the channel impulse response coefficients $h_{1,k}(\tau_0)$ and $h_{2,k}(\tau_0)$, respectively, and the vertical solid lines $49_1$ and $49_2$ represent the channel impulse response coefficients $h_{1,k}(\tau)$ and $h_{2,k}(\tau)$, respectively, at the channel indexes k. The span W of the equalizer 23 is shown as six of the channel indexes k. The cursor c has a range of channel indexes k from $-K_1$ to $+K_2-W$.

In the exemplary case, it can be seen by inspection that the channel impulse response coefficients $h_{1,k}(\tau_0)$ have an equalizer span W concentration of energy indicated by a symbol timing marker $S_1$ corresponding to the cursor c that in turn corresponds to the channel index k=9 (moving $S_1$ by one channel index k in either direction will decrease the sum of the first channel response energies $|h_{1,k}(\tau_0)|^2$ in the span W). Similarly, for the second channel response coefficients $h_{2,k}(\tau_0)$ it can be seen by inspection that the symbol timing marker $S_2$ for the equalizer span W concentration of energy corresponds to the cursor c that corresponds to the channel index k=15 (moving $S_2$ by one channel index k in either direction will decrease the sum of the second channel response energies $|h_{2,k}(\tau_0)|^2$ in the span W).

FIG. 4C shows the results of calculations in the exemplary case according to the equation 2 for the multichannel combined metrics $\alpha(c, \tau)$ for the MLSE embodiment 20A (FIG. 3) for the cursors c from $-K_1$ to $+K_2-W$. The vertical bars 50 represent the energy levels of the multichannel combined metrics $\alpha(c, \tau)$ for the cursors c from $-K_1$ to $+K_2-W$. The multichannel symbol timing marker $S_C$ indicates the cursor c corresponding to the channel index k=10 for the largest of the multichannel combined metrics $\alpha(c, \tau)$ for the equalizer span W concentration of energy for the multichannel signal receiver 10 of the present invention. It should be noted that the joint symbol timing marker $S_C$ of the present invention is not equal to either of the individual markers $S_1$ or $S_2$, or to their average. More generally, there is no way to derive the joint symbol timing marker Sc from the knowledge of $S_1$ and $S_2$ alone, other than using the joint timing recovery methods of the present invention.

Figure 5:
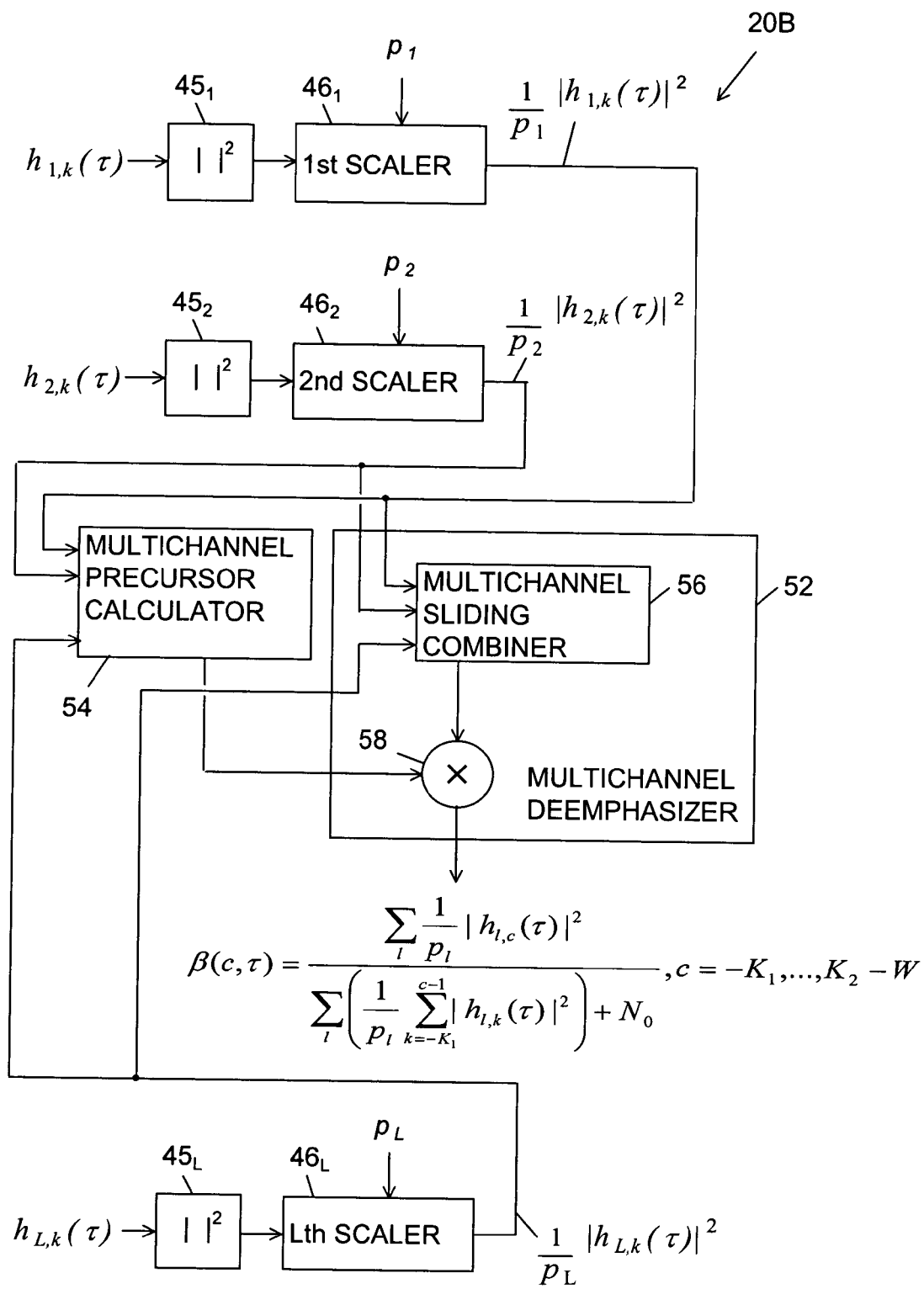
FIG. 5 is a block diagram of a DFE embodiment of a multichannel combiner of the receiver of FIG. 1.

FIG. 5 is a block diagram of an DFE embodiment of the multichannel combiner 20 referred to with the reference designator 20B. The DFE multichannel combiner 20B computes a series of multichannel combined metrics, denoted as $\beta(c, \tau)$, according to an equation 3, below.

$$\beta(c, \tau) = \frac{\sum_l \frac{1}{p_l}|h_{l,c}(\tau)|^2}{\sum_l \left( \frac{1}{p_l} \sum_{k=-K_1}^{c-1} |h_{l,k}(\tau)|^2 \right) + N_0}, \quad c = -K_1, \ldots, K_2 - W \quad (3)$$

As shown in the equation 3, the multichannel combiner 20B determines the series of multichannel combined metrics $\beta(c, \tau)$ by inversely scaling (deemphasizing) a sum of the channel response energies $1/p_1|h_{1,c}(\tau)|^2$, $1/p_2|h_{2,c}(\tau)|_2$ through $1/p_L|h_{L,c}(\tau)|^2$ corresponding to a particular one of the index cursors c by a sum of an initial precursor term $N_0$ plus a sum of the channel response energies $1/p_1|h_{1,k}(\tau)|^2$, $1/p_2|h_{2,k}(\tau)|^2$ through $1/p_L|h_{L,k}(\tau)|^2$ for the index k ranges from the first index $-K_1$ to one less than the particular index cursor c, for the series of the index cursors c, respectively. The series of the cursors c takes on indexes from the first channel index $-K_1$ to the equalizer span W less than the last channel index $+K_2$. When the optional noise scale factors $1/p_1$, $1/p_2$ through $1/p_L$ are used, the initial precursor term $N_0$ may be set to one. When the optional noise scale factors $1/p_1$, $1/p_2$ through $1/p_L$ are not used, the initial precursor term $N_0$ should be set to some function of the noise levels $p_1$, $p_2$ through $p_L$, preferably the lowest of the noise levels $p_1$, $p_2$ through $p_L$.

For example when the current cursor $c=-K_1$, the multichannel combined metric $\beta(c, \tau)$ is the sum of the channel response energies $1/p_1|h_{1,-K_1}(\tau)|^2 + 1/p_2|h_{2,-k_1}(\tau)|^2$ through $+1/p^L|h_{L,-K_1}(\tau)|^2$ divided by $1/N_0$. When the cursor $c=-K_1+1$, the multichannel combined metric $\beta(c, \tau)$ is the sum of the channel response energies $1/p^1|h_{1,-K_1+1}(\tau)|^2 + 1/p_2|h_{2,-K_1+1}(\tau)|^2$ through $+1/p_L|h_{L,-K_1+1}(\tau)|^2$ divided by the sum of the initial precursor term $N_0$ plus the channel response energies $1/p_1|h_{1,-K_1+1}(\tau)|^2 + 1/p_2|h_{2,-K_1+1}(\tau)|^2$ through $+1/p_L|h_{L,-K_1+1}(\tau)|^2$. When the cursor $c=-K_1+2$, the multichannel combined metric $\beta(c, \tau)$ is the sum of the channel response energies $1/p^1|h_{1,-K_1+2}(\tau)|^2 + 1/p_2|h_{2,-k_1+2}(\tau)|^2$ through $+1/p_L|h_{L,-K_1+2}(\tau)|^2$ divided by the sum of the initial precursor term $N_0$ plus $1/p^1|h_{1,-K_1+1}(\tau)|^2 + 1/p_2|h_{2,-K_1+1}(\tau)|^2$ through $+1/p_L|h_{L,-K_1+1}(\tau)|^2$ plus $1/p_1|h_{1,-k_1+2}(\tau)|^2 + 1/p_2|h_{2,-K_1+2}(\tau)|^2$ through $+1/p_L|h_{L,-K_1+2}(\tau)|^2$. The example may be continued on in the same way for the cursor c from $-K_1+2$ to $+K_2-W$.

In a preferred embodiment the DFE multichannel combiner 20B includes a multichannel deemphasizer 52 and a multichannel precursor calculator 54. The DFE multichannel combiner 20B also includes the fuinctional squarers $45_1$, $45_2$ through $45_L$ and optionally the functional scalers $46_1$, $46_2$ through $46_L$ operating as described above. The multichannel deemphasizer 52 includes a multichannel sliding combiner 56 and a scaler 58.

The multichannel precursor calculator 54 sums the initial precursor term $N_0$ and the channel response energies $1/p_1|h_{1,k}(\tau)|^2$, $1/p_2|h_{2,k}(\tau)|^2$ through $1/p_L|h_{L,k}(\tau)|^2$ over a range of the channel indexes k from $-K_1$ to the channel index k one less than the cursor c for the series of cursors c from $-K_1$ to $K_2-W$ for determining a series of precursor deemphasis coefficients. When the cursor $c=-K_1$, the precursor deemphasis coefficient is $N_0$. The multichannel sliding combiner 56 sums the channel response energies $1/p_1|h_{1,c}(\tau)|^2$, $1/p_2|h_{2,c}(\tau)|^2$ through $1/p_L|h_{L,c}(\tau)|^2$ for the cursor c for providing a series of multichannel single index sums for the series of cursors c from $-K_1$ to $K_2-W$. The scaler 58 deemphasizes (inversely scales) the series of multichannel single index sums by the series of precursor deemphasis coefficients, respectively, for providing the series of multichannel combined metrics $\beta(c, \tau)$. The metric comparator 22 determines the largest one of the multichannel combined metrics $\beta(c, \tau)$ and then uses the argument $(c, \tau)$ of the largest of the multichannel combined metrics $\beta(c, \tau)$ for the symbol timing marker $S_C$.

Figure 6:
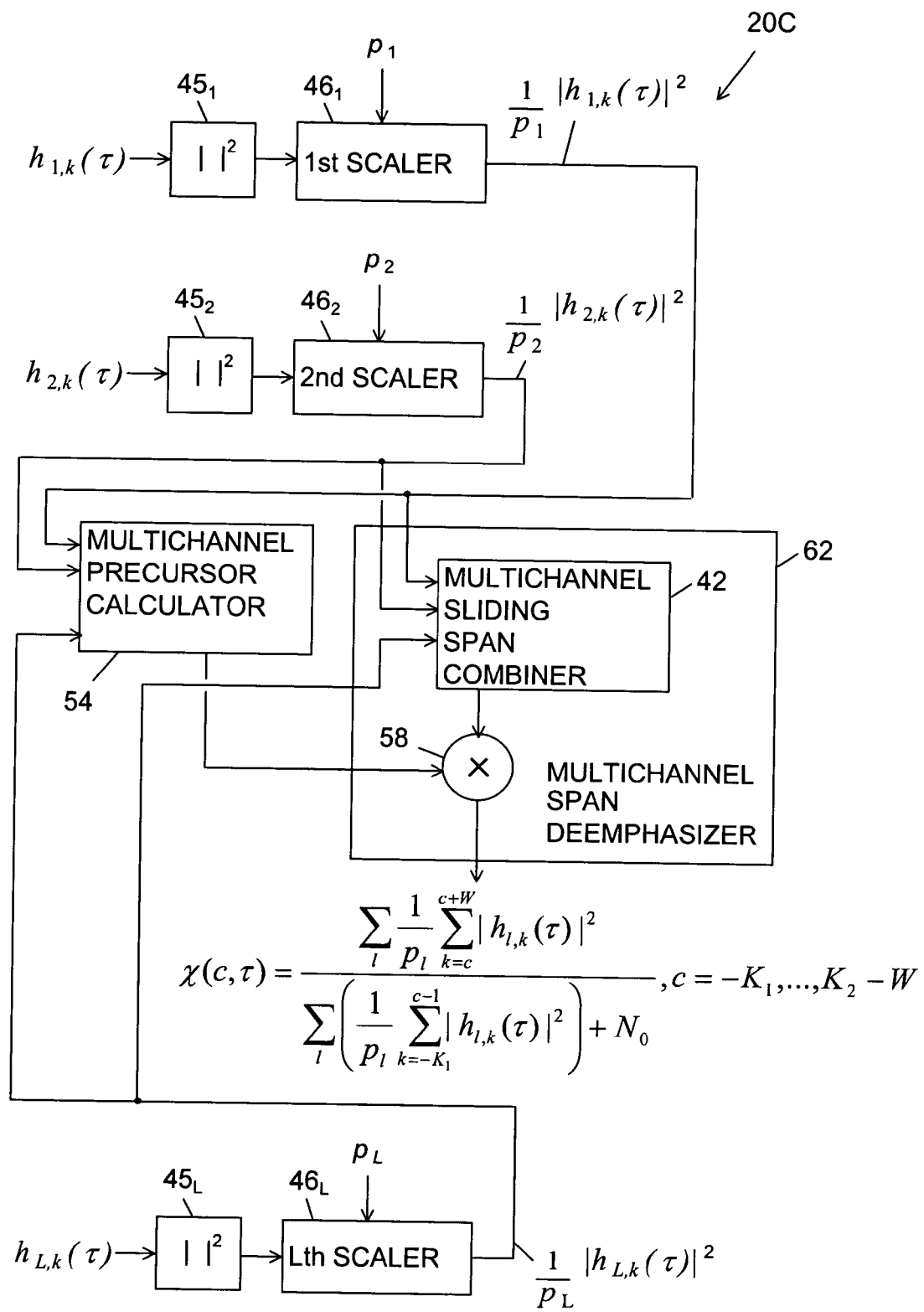
FIG. 6 is a block diagram of a DDFSE embodiment of a multichannel combiner of the receiver of FIG. 1.

FIG. 6 is a block diagram of an DDFSE embodiment of the multichannel combiner 20 referred to with the reference designator 20C. The DDFSE multichannel combiner 20C computes a series of multichannel combined metrics, denoted as $\chi(c, \tau)$, according to an equation 4, below.

$$\chi(c,\tau) = \frac{\sum_l \frac{1}{p_l} \sum_{k=c}^{c+W} |h_{l,k}(\tau)|^2}{\sum_l \left( \frac{1}{p_l} \sum_{k=-K_1}^{c-1} |h_{l,k}(\tau)|^2 \right) + N_0}, \quad c = -K_1, \ldots, K_2-W \quad (4)$$

As shown in the equation 4, the multichannel combiner determines the series of multichannel combined metrics $\chi(c, \tau)$ by inversely scaling (deemphasizing) a sum of the channel (impulse) response energies $1/p_1|h_{1,k}(\tau)|^2$, $1/p_2|h_{2,k}(\tau)|^2$ through $1/p_L 51\ h_{L,k}(\tau)|^2$ for index k ranges equal to the equalizer span W starting at particular index cursors c with a sum of the initial precursor term $N_0$ plus a sum of the channel response energies $1/p_1|h_{1,k}(\tau)|^2$, $1/p_2|h_{2,k}(\tau)|^2$ through $1/p_L|h_{L,k}(\tau)|^2$ for the index k ranges from the first index $-K_1$ to one less than the particular index cursors c,. The series of the cursors c takes on indexes from the first channel index $-K_1$ to the equalizer span W less than the last channel index $+K_2$.

In a preferred embodiment the DDFSE multichannel combiner 20C includes a multichannel span deemphasizer 62; and the multichannel precursor calculator 54, the functional squarers $45_1$, $45_2$ through $45_L$, and optionally the functional scalers $46_1$, $46_2$ through $46_L$ operating as described above. The multichannel span deemphasizer 62 includes the multichannel sliding span combiner 42 and the scaler 58 operating as described above using the precursor deemphasis coefficients and the channel response energies $1/p_1|h_{1,k}(\tau)|^2$, $1/p_2|h_{2,k}(\tau)|^2$ through $1p_L|h_{L,k}(\tau)|^2$ for providing the series of channel combined metrics $\chi(c, \tau)$. The metric comparator 22 determines the largest of the multichannel combined metrics $\chi(c, \tau)$ and then uses the argument $(c, \tau)$ of the largest of the multichannel combined $\chi(c, \tau)$ for the symbol timing marker $S_C$.

Figure 7A:
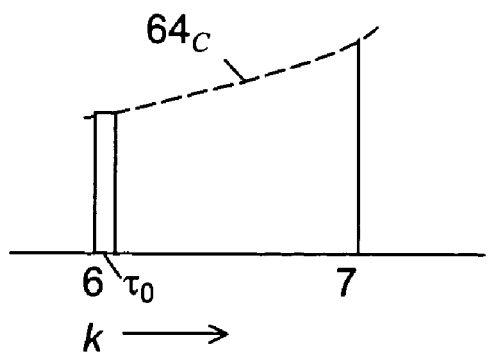
FIGS. 7A–D are charts showing phases $\tau_0$–$\tau_3$, respectively, for exemplary multichannel combined metrics for the receiver of FIG. 1.
Figure 7C:
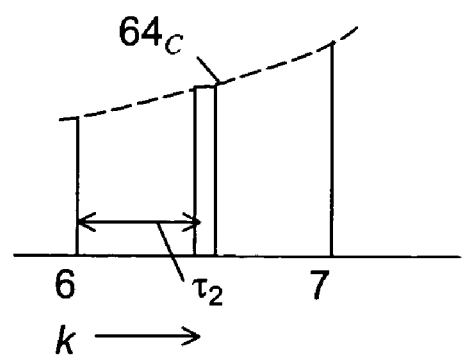
Figure 7B:
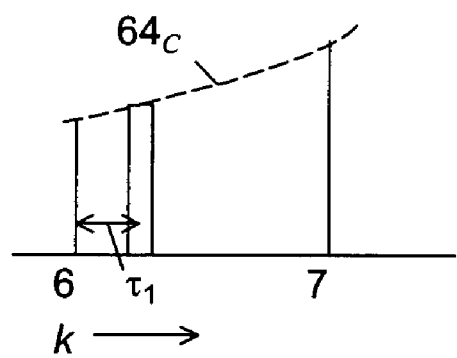
Figure 7D:
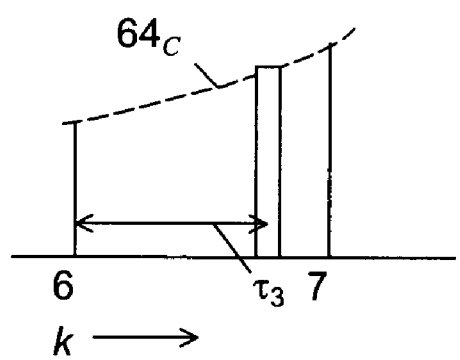

FIGS. 7A, B, C, and D illustrate the phases $\tau$ of the channel index k at phase $\tau_0$, phase $\tau_1$, phase $\tau_2$, and phase $\tau_3$, respectively, the multichannel combined metrics $\alpha(c, \tau)$, $\beta(c, \tau)$ or $\chi(c, \tau)$. An envelope of the multichannel combined metrics $\alpha(c, \tau)$, $\beta(c, \tau)$ or $\chi(c, \tau)$ between the channel indexes k=6 and k=7 is shown as a dotted line $64_C$. The phases $\tau$ for more than one sample per symbol time period may be used for providing for providing phased channel impulse response indexes k, $\tau$. Where the phases $\tau$ are used, the multichannel combiner 20 computes phased multichannel combined metrics for each of the cursors c for each of the phases $\tau$. The metric comparator 22 determines the largest of the phased multichannel combined metrics and determines the symbol timing index $S_C$ from the associated cursor c and the phase $\tau$ of the largest phased multichannel combined metric.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and /modifications as fall within the true spirit and scope of the invention.

The invention claimed is:

1. A wireless signal receiver, comprising:
two or more receiver chains having spatially diverse antennas for receiving a transmitted signal and providing two or more receiver chain signals, respectively;

two or more channel estimators using said two or more receiver chain signals for estimating two or more sets of channel impulse response coefficients, respectively; and a multichannel combined timer using said two or more sets of said channel coefficients for determining a multichannel combined symbol timing marker for synchronizing received symbols jointly for said two of more receiver chain signals.

2. The receiver of claim 1, further comprising:

an equalizer for jointly equalizing said synchronized received symbols for said two of more receiver chain signals for providing equalized symbols for said transmitted signal.

3. The receiver of claim 1, wherein:

the multichannel combined timer includes a multichannel combiner for combining channel response energies corresponding to said channel coefficients, respectively, in said two or more sets for index ranges of said channel coefficients into a series of multichannel combined metrics having a corresponding series of index cursors, said multichannel combined metrics used for identifying one of said index cursors as said symbol timing marker.

4. The receiver of claim 3, wherein:

the multichannel combined timer further includes a metric comparator for determining said symbol timing marker as a one of said index cursors associated with a largest one of said multichannel combined metrics.

5. The receiver of claim 3, wherein:

the multichannel combiner includes scalers for weighting said channel response energies of said two or more sets of said channel coefficients with two or more scale factors, respectively, for providing scaled said channel response energies, the multichannel combiner combining said scaled channel response energies for determining said multichannel combined metrics.

6. The receiver of claim 5, further including:

two or more noise estimators for determining two or more noise levels from said two or more receiver chain signals, respectively; wherein said scale factors are inversely dependent on said noise levels, respectively.

7. The receiver of claim 3, wherein:

said channel coefficients have associated impulse response indexes from a first index to a last index for profiling delay spreads for two or more signal channels for said transmitted signal received by said two or more receiver chains, respectively; and said index cursors correspond to said impulse response indexes in a cursor range from said first index to an equalizer index span less than said last index.

8. The receiver of claim 7, wherein:

the multichannel combiner determines said series of said multichannel combined metrics by combining said channel response energies for said impulse response indexes in said index ranges equal to said equalizer index span starting at said index cursors for said series of said index cursors, respectively.

9. The receiver of claim 7, wherein:

the multichannel combiner determines said series of said multichannel combined metrics by inversely scaling a sum of said channel response energies corresponding to a particular one of said index cursors by a sum of an initial precursor term plus a sum of said channel response energies at said impulse response indexes for said index ranges from said first index to one less than said particular index cursor for said series of said index cursors, respectively.

10. The receiver of claim 7, wherein:

the multichannel combiner determines said series of multichannel combined metrics by inversely scaling a sum of said channel response energies for said impulse response indexes for said index ranges equal to said equalizer index span starting at particular said index cursors in said series of said index cursors by a sum of an initial precursor term plus a sum of said channel response energies at said impulse response indexes for said index ranges from said first index to one less than said particular index cursors for said series of said index cursors, respectively.

11. The receiver of claim 7, wherein:

said impulse response indexes have at least two phases;

the two or more channel estimators provide each of said two or more sets of said channel coefficients at each of said least two phases for providing phased said channel coefficients;

the multichannel combiner combines said channel response energies for said two or more sets of said phased channel coefficients for determining phased said multichannel combined metrics; and the metric comparator issues said symbol timing marker corresponding to a one of said index cursors associated with a largest one of said phased multichannel combined metrics.

12. A method for receiving a wireless signal, comprising:

receiving a transmitted signal in two or more receiver chains having spatially diverse antennas for providing two or more receiver chain signals, respectively;

estimating two or more sets of channel impulse response coefficients from said two or more receiver chain signals, respectively; and determining a multichannel combined symbol timing marker from said two or more sets of said channel coefficients for synchronizing received symbols jointly for said two of more receiver chain signals.

13. The method of claim 12, further comprising:

equalizing said synchronized received symbols jointly for said two of more receiver chain signals for providing equalized symbols for said transmitted signal.

14. The method of claim 12, wherein:

determining said multichannel combined symbol timing marker includes combining channel response energies corresponding to said channel coefficients, respectively, in said two or more sets for index ranges of said channel coefficients into a series of multichannel combined metrics having a corresponding series of index cursors for designating equalizer index spans of said channel coefficients, said multichannel combined metrics used for identifying one of said index cursors as said symbol timing marker.

15. The method of claim 14, wherein:

determining said multichannel combined symbol timing marker includes determining a largest one of said multichannel combined metrics and using a one of said index cursors associated with said largest one of said multichannel combined metrics as said symbol timing marker.

16. The method of claim 14, wherein:

combining said channel response energies includes weighting said channel response energies of said two or more sets of said channel coefficients with two or more scale factors, respectively, for providing scaled said channel response energies; and combining said scaled channel response energies for determining said multichannel combined metrics.

17. The method of claim 16, further comprising:

determining two or more noise levels for said two or more receiver chain signals, respectively; and calculating said scale factors as inversely dependent on said noise levels, respectively.

18. The method of claim 14, wherein:

said channel coefficients have associated impulse response indexes from a first index to a last index for profiling delay spreads for two or more signal channels for said transmitted signal received by said two or more receiver chains, respectively; and said index cursors correspond to said impulse response indexes in a cursor range from said first index to an equalizer index span less than said last index.

19. The method of claim 18, wherein:

combining said channel response energies includes determining said series of said multichannel combined metrics by combining channel response energies for said impulse response indexes in said index ranges equal to said equalizer index span starting at said index cursors for said series of said index cursors, respectively.

20. The method of claim 18, wherein:

combining said channel response energies includes determining said series of said multichannel combined metrics by deemphasizing a sum of said channel response energies corresponding to a particular one of said index cursors by a sum of an initial precursor term plus a sum of said channel response energies at said impulse response indexes for said index ranges from said first index to one less than said particular index cursor for said series of said index cursors, respectively.

21. The method of claim 18, wherein:

combining said channel response energies includes determining said series of multichannel combined metrics by deemphasizing a sum of said channel response energies for said impulse response indexes for said index ranges equal to said equalizer index span starting at particular said index cursors in said series of said index cursors by a sum of an initial precursor term plus a sum of said channel response energies at said impulse response indexes for said index ranges from said first index to one less than said particular index cursors for said series of said index cursors, respectively.

22. The method of claim 18, wherein:

said impulse response indexes have at least two phases;

estimating said two or more sets of said channel impulse response coefficients includes estimating said two or more sets of said channel coefficients at each of said least two phases for providing phased said channel coefficients;

combining said channel response energies includes combining said channel response energies for said two or more sets of said phased channel coefficients for determining phased said multichannel combined metrics; and determining a multichannel combined symbol timing marker includes determining said symbol timing marker corresponding to a one of said cursors associated with a largest one of said phased multichannel combined metrics.

* * * * *